(12) United States Patent
Matsuda et al.

(10) Patent No.: US 7,511,000 B2
(45) Date of Patent: Mar. 31, 2009

(54) GEAR PART WITH LUBRICATION COATING AND METHOD OF MANUFACTURING THE SAME

(75) Inventors: Yoshiharu Matsuda, Tochigi-ken (JP); Kazuo Tatsumi, Nara-ken (JP); Tohji Yokoyama, Nara-ken (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 662 days.

(21) Appl. No.: 10/988,701

(22) Filed: Nov. 16, 2004

(65) Prior Publication Data

US 2005/0145052 A1  Jul. 7, 2005

(30) Foreign Application Priority Data

Nov. 27, 2003 (JP) ............................. 2003-397408

(51) Int. Cl.
  *C10M 137/04* (2006.01)
  *C10M 169/04* (2006.01)
  *C10M 141/08* (2006.01)

(52) U.S. Cl. ..................... 508/433; 508/154; 508/339

(58) Field of Classification Search ................. 508/154, 508/339, 433
See application file for complete search history.

(56) References Cited

U.S. PATENT DOCUMENTS

| 4,215,002 | A | * | 7/1980 | Fein ............................ 508/436 |
| 5,358,650 | A | * | 10/1994 | Srinivasan et al. .......... 508/194 |
| 6,096,691 | A | | 8/2000 | Conary et al. |
| 6,569,816 | B2 | * | 5/2003 | Oohira et al. ............... 508/107 |
| 6,992,049 | B2 | * | 1/2006 | Deckman et al. ............ 508/591 |

FOREIGN PATENT DOCUMENTS

| JP | 6-166887 A | 6/1994 |
| JP | 7-090611 A | 4/1995 |
| JP | 8-509016 A | 9/1996 |
| JP | 2003-119482 A | 4/2003 |
| WO | WO 9964544 A1 * | 12/1999 |

\* cited by examiner

*Primary Examiner*—Glenn Caldarola
*Assistant Examiner*—Jim Goloboy
(74) *Attorney, Agent, or Firm*—Foley & Lardner LLP

(57) ABSTRACT

A gear part of the present invention includes a lubrication coating formed on a surface of the gear part, the lubrication coating containing an organic phosphorous compound. In the gear part, when a tooth surface of the gear part is engaged with a tooth surface of a counter member, the organic phosphorous compound is transferred to the tooth surface of the counter member and another lubrication coating containing the organic phosphorous compound is formed on the tooth surface of the counter member. As a result, the lubrication coating can be held on the surface of the gear part for long periods.

9 Claims, 4 Drawing Sheets

FIG.5

| | CHEMICALS | EXAMPLE 1 (% BY MASS) | EXAMPLE 2 (% BY MASS) | EXAMPLE 3 (% BY MASS) | EXAMPLE 4 (% BY MASS) | EXAMPLE 5 (% BY MASS) |
|---|---|---|---|---|---|---|
| ORGANIC PHOSPHOROUS COMPOUND (ALKYLPHOSPHONATE DERIVATIVE) | MONOPROPYL ALKYLPHOSPHONATE ESTER (CARBON NUMBER 35) | 0.9 | | | 0.5 | 1.0 |
| | DIOCTYL ALKYLPHOSPHONATE ESTER (CARBON NUMBER 20) | | 5.0 | | 1.0 | |
| | MONOOCTADECANYL ALKYLPHOSPHONATE ESTER (CARBON NUMBER 12) | | | 8.0 | | 0.5 |
| INORGANIC SALT | SODIUM TRIPOLYPHOSPHATE | 5.0 | | 3.0 | 1.0 | 4.0 |
| | SODIUM PHOSPHOMOLYBDATE | | 10.0 | 1.0 | 0.5 | 3.0 |
| SULFURIZED FATTY ACID | SULFURIZED OLEIC ACID | 2.0 | | 5.0 | 3.0 | 1.0 |
| | SULFURIZED PALMITIC ACID | | 5.0 | | 1.0 | 5.0 |
| ORGANIC ACID | DODECYL SUCCINIC ACID | 0.5 | | 0.5 | 1.0 | 2.0 |
| | PARA TERT-BUTYL BENZOIC ACID | 0.5 | 1.0 | 1.5 | | |
| ORGANIC AMINE | MONOISOPROPANOLAMINE | 0.5 | | 1.0 | 1.0 | 0.5 |
| | N,N-DIETHYLETHANOLAMINE | 0.5 | | | 3.0 | 0.5 |
| | N,N-DIMETHYLETHANOLAMINE | | 2.0 | 1.0 | | 0.5 |
| EMULSIFIER | POLYOXYETHYLENE OCTYLPHENYL ETHER | 0.5 | 3.0 | | 5.0 | 0.5 |
| | POLYOXYETHYLENE LAURYL ESTER | | | 3.0 | | 0.5 |
| WATER | | REMAINING | REMAINING | REMAINING | REMAINING | REMAINING |

US 7,511,000 B2

GEAR PART WITH LUBRICATION COATING AND METHOD OF MANUFACTURING THE SAME

BACKGROUND OF THE INVENTION

1. Field of the Invention

The present invention relates to a gear part on the surface of which a coating excellent in sliding lubricity is formed and relates to a method of manufacturing the gear part.

2. Description of the Related Art

In order to improve the lubricity, abrasion resistance, initial fitness, and the like in engagement of tooth surfaces of gear parts made of metal, lubrication coatings are formed on sliding surfaces. There have been proposed lubrication coatings made of various materials. In order to secure the initial fitness of gears, the lubrication coating is formed by a treatment called a lubricating treatment which forms a lubrication coating on a surface engaged with a surface of another member. As the lubrication coating, a phosphate conversion coating has been proposed (Japanese Patent Application Laid-Open No. H7-90611). Generally, for forming the conversion coating, a specified chemical substance is used.

SUMMARY OF THE INVENTION

However, to form the coating on a sliding surface of the gear part by means of chemical conversion, the gear part needs to be held in a chemical conversion solution at high temperature for a certain period of time. For example, the gear part is required to be immersed in the chemical conversion solution at a temperature as high as about 50° C. to 100° C. for about 5 to 20 minutes. As described in the Japanese Patent Application Laid-Open No. H7-90611, use of an aqueous-based chemical conversion solution can lower the treatment temperature. However, chemical conversion of the sliding surface of the gear part with a predetermined chemical conversion solution requires particular equipment, thus increasing manufacturing costs of the gear part. Therefore, a method of readily forming a lubrication coating is required.

In terms of properties of the lubrication coating, a lubrication coating with a lubricity lasting for longer periods is desired so as to be applied to use for long periods, such as a vehicle.

An object of the present invention is to provide a gear part including a lubrication coating with a long-lasting lubricity and to provide a method of readily manufacturing the lubrication coating.

The first aspect of the present invention provides a gear part comprising: a lubrication coating formed on a surface of the gear part, the lubrication coating containing an organic phosphorous compound, wherein when a tooth surface of the gear part is engaged with a tooth surface of a counter member, the organic phosphorous compound is transferred to the tooth surface of the counter member and another lubrication coating containing the organic phosphorous compound is formed on the tooth surface of the counter member.

The second aspect of the present invention provides A method of manufacturing a gear part comprising: adhering an aqueous lubricant composition on a surface of the gear part, the aqueous lubricant composition containing water and an organic phosphorous compound; and evaporating water within the aqueous lubricant composition adhered on the surface of the gear part in order to form a lubrication coating on the surface of the gear part, wherein when a tooth surface of the gear part is engaged with a tooth surface of a counter member, the organic phosphorous compound is transferred to the tooth surface of the counter member and another lubrication coating containing the organic phosphorous compound is formed on the tooth surface of the counter member.

BRIEF DESCRIPTION OF THE DRAWINGS

The invention will now be described with reference to the accompanying drawings wherein;

FIG. 5 is a table showing ingredients contained in lubricant compositions of examples.

DETAILED DESCRIPTION OF THE PREFERRED EMBODIMENT

Hereinafter, description will be made of embodiments of the present invention with reference to the drawings.

A first aspect of the present invention is a gear part with a lubrication coating formed on the surface to improve an initial fitness when tooth surfaces are engaged with each other. The gear part contains an organic phosphorous compound. When the tooth surface of the gear part is engaged with a tooth surface of a counter member, the organic phosphorous compound is capable of being transferred to the tooth surface of the counter member.

Figure 1A:
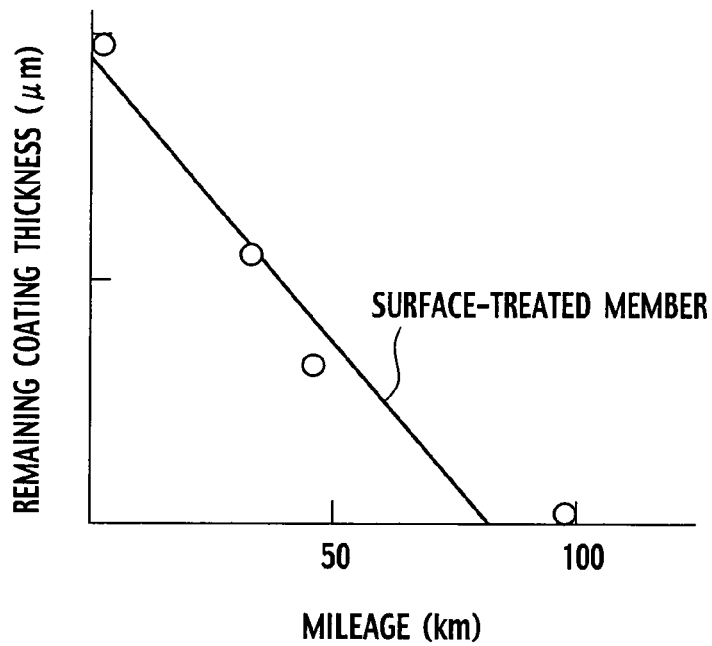
FIG. 1A is a graph showing a relationship between mileage and remaining coating thickness in a conventional gear surface formed by chemical conversion.
Figure 1B:
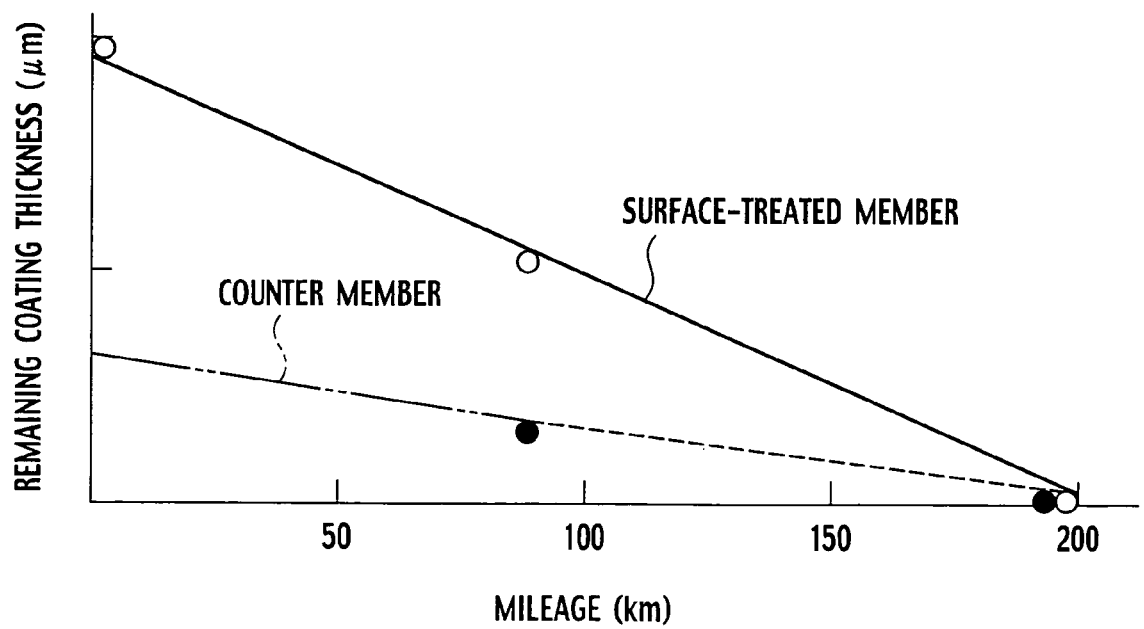
FIG. 1B is a graph showing a relationship between mileage and remaining coating thickness in a gear surface of the present invention.

The lubricating ability of the gear part of the present invention can last for long periods. FIGS. 1A and 1B are graphs each showing a relationship between mileage and remaining thickness of a coating formed on a surface of a gear of a final drive. FIG. 1A shows a relationship between the mileage and the remaining coating thickness in a conventional gear surface formed by chemical conversion. FIG. 1B shows a relationship between the mileage and the remaining coating thickness in the gear surface of the present invention. FIGS. 1A and 1B are drawn in a same scale.

As shown in FIG. 1, the lubrication coating present on the surface of the gear part of the present invention remains for long periods, and the lubricity lasts for long periods. The gear part of the present invention is therefore advantageous especially for an application whose performance is required to be maintained for long periods, such as a vehicle.

The good persistence of the lubrication coating formed on the surface of the gear part of the present invention is because the lubrication coating can be transferred to a surface of a member with which the gear part engages. In FIG. 1B, a "counter member" means a member with which the gear part of the present invention engages, and a "surface-treated member" indicates the gear part of the present invention. The relationship between the "surface-treated member" and the "counter member" corresponds to that between gears engaged with each other. Initially, the lubrication coating is formed only on the surface of the gear part indicated by the "surface-treated member". The lubrication coating is transferred to the surface of the counter member along with engagement of the gears, and a lubrication coating is formed on the surface of the counter member. As a result, the lubrication coating can be held on the surface of the gear part for long periods.

Figure 2A:
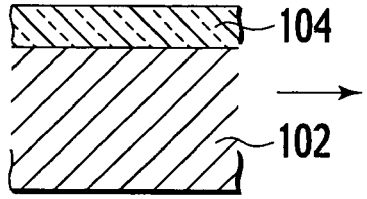
FIGS. 2A, 2B, and 2C are schematic views for explaining a way that a lubrication coating is formed on a surface of a counter member.
Figure 2B:
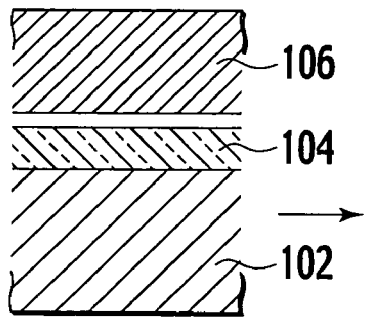
Figure 2C:
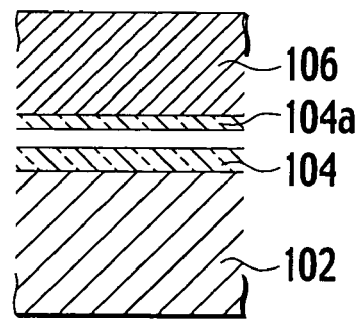

A description is given of a way that the lubrication coating is formed on the counter member with reference to FIGS. 2A to 2C. In the gear part of the present invention, a lubrication coating 104 capable of being transferred to a member with which the gear part engages is formed (FIG. 2A). A gear part 102 with the lubrication coating 104 formed thereon is placed opposite to a counter member 106 such as a gear (FIG. 2B). The gear part 102 and the counter member 106 are then used to transmit power. In the drawings, teeth of the gear part are omitted for convenience of explanation. As a matter of convenience, a space is provided between the lubrication coating 104 and the counter member 106 in the drawing for clearly showing that the gear part 102 with the lubrication coating 104 and the counter member 106 are different members. The thickness of the lubrication coating is, depending on types of the gear part, generally 1 to 50 μm.

When the lubrication coating 104 is a conventional coating formed by chemical conversion, the lubrication coating 104 has a high coating strength and excellent adhesion to the gear part. However, the lubrication coating 104 is likely to be crushed due to mechanical friction involved in use of the gear part 102 and the counter member 106 and is thus simply reduced. However, in the gear part of the present invention, the lubrication coating 104 formed on the surface of the gear part 102 is not simply reduced and is transferred to the surface of the counter member 106 by engagement of the gear part 102 with the counter member 106, so that a lubrication coating 104a is formed on the counter member 106. When the lubrication coating 104a is formed on the surface of the counter member 106 as described above, the lubrication coating is held between the gear part 102 and the counter member 106 for long periods.

In order to transfer the lubrication coating to the counter member 106, the formed lubrication coating is preferably an organic coating. The organic coating is flexible and likely to be transferred. Specifically, the lubrication coating contains an organic phosphorous compound capable of being transferred to the tooth surface of the counter member engaged with the gear part. The lubrication coating contains, preferably, an alkylphosphonate derivative expressed by the following Formula I as the organic phosphorous compound.

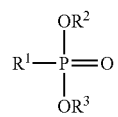

Formula I

In Formula I, $R^1$ is an alkyl group with 10 to 50 carbon atoms. $R^2$ and $R^3$ may be either the same or different from each other. Each of $R^2$ and $R^3$ is a hydrogen atom or an alkyl group with 1 to 10 carbon atoms, and at least one of $R^2$ and $R^3$ is the alkyl group with 1 to 10 carbon atoms.

The lubrication coating can be formed by adhering an aqueous lubricant composition to the surface of the gear part and evaporating water. The aqueous lubricant composition contains such an alkylphosphonate derivative, at least one inorganic salt selected from a group consisting of inorganic phosphate, inorganic borate, and inorganic silicate, and water.

Since the lubricant composition contains a predetermined alkylphosphonate derivative, the formed coating is an organic coating. Moreover, since the lubricant composition contains an inorganic salt such as inorganic phosphate, the formed coating has a proper hardness. The formed lubrication coating being an organic coating and capable of being transferred are presumed to be influenced by a fact that a carbon atom and a phosphorous atom are directly coupled with each other in the phosphorous compound of Formula I. In a general phosphorous compound used for a lubricant, every atom directly coupled with a phosphorous atom is an oxygen atom. In other words, the general phosphorous compound having a same structure as Formula I has a "C-O-P" coupling in which an oxygen atom is between a carbon atom and a phosphorous atom. A "C-P" coupling is stronger, thermally stabler, and less likely to be disconnected than the "C-O-P" coupling. Therefore, such a coating continues remaining as the organic coating on the surface of the gear part. When the lubrication coating is an organic coating, the lubrication coating is flexible, and, as aforementioned, can be transferred to the engaging surface of the counter member. Note that the technical scope of the present invention is not limited to an embodiment in which the aforementioned mechanism exerts an effect.

Next, a detailed description is given of components of the aqueous lubricant composition containing the alkylphosphonate derivative expressed by Formula I, inorganic salt, and water.

The lubricant composition contains the alkylphosphonate derivative expressed by the following Formula I.

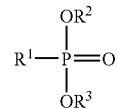

Formula I $R^1$ is an alkyl group with 10 to 50 carbon atoms. The alkyl group may have a straight-chain, branched-chain, or annular structure. Specific examples of the alkyl group with 10 to 50 carbon atoms include a decyl group, an undecyl group, a dodecyl group, a tetradecyl group, an octadecyl group, an i-octadecyl group, an eicosyl group, an octacosyl group, a triacontacyl group, a tetracontacyl group, a pentacontacyl group, a hexacontacyl group, a docosyl group, a tetracosyl group, a hexacosyl group, and a pentylcontacyl group.

Each of $R^2$ and $R^3$ is a hydrogen atom or an alkyl group with 1 to 10 carbon atoms. The alkyl group has a straight-chain, branched-chain, or annular structure. $R^2$ and $R^3$ are either the same or different from each other. Examples of the alkyl group with 1 to 10 carbon atoms include a methyl group, an ethyl group, a propyl group, an i-propyl group, a butyl group, an i-butyl group, a pentyl group, a hexyl group, a 2-ethylhexyl group, a heptyl group, an octyl group, a nonyl group, and a decyl group.

In the alkylphosphonate derivative expressed by Formula I, at least one of $R^2$ and $R^3$ is not a hydrogen atom but an alkyl group with 1 to 10 carbon atoms. The alkylphosphonate derivative expressed by Formula I is then monoalkyl alkylphosphonate ester or dialkyl alkylphosphonate ester. In some situations, more than one type of the alkylphosphonate derivative may be used.

The alkylphosphonate derivative expressed by Formula I has a large adsorptivity to a metal surface. In addition, the alkylphosphonate derivative expressed by Formula I is chemically stable, and the compound thereof is less likely to be decomposed even in a high-pressure and high temperature environment. Moreover, the alkylphosphonate derivative expressed by Formula I can be transferred to an opposite member. Because of these actions, the lubricant composition containing the alkylphosphonate derivative expressed by Formula I offers a long-lasting lubricating effect.

Preferably, the content of the alkylphosphonate derivative is within a range from 0.1 to 10% by mass of the total mass of the lubricant composition. When the content is too little, the effect of the alkylphosphonate derivative cannot be exerted. In the case where the content is too much, the lubrication coating can be too thick when formed on the gear part, and the excess coating can be detached or be solubilized in some cases. When two or more types of the alkylphosphonate derivative are used, it is enough that the total content thereof is within the aforementioned range.

The lubricant composition contains an inorganic salt selected from the group consisting of inorganic phosphate, inorganic borate, and inorganic silicate. The inorganic phosphate is a salt of various types of phosphoric acid and means a compound as an inorganic substance. The inorganic borate is a salt of boric acid and means a compound as an inorganic substance. The inorganic silicate is a salt of silicic acid and means a compound as an inorganic substance. These inorganic salts increases the hardness of the lubrication coating formed. Specific examples of the inorganic salts include inorganic phosphate such as disodium phosphite, dipotassium phosphite, disodium orthophosphate, dipotassium orthophosphate, sodium phosphate, potassium phosphate, sodium hypophosphite, potassium hypophosphite, sodium pyrophosphate, potassium pyrophosphate, sodium hexametaphosphate, potassium hexametaphosphate, sodium polyphosphate, potassium polyphosphate, sodium metaphosphate, potassium metaphosphate, sodium phosphomolybdate, potassium phosphomolybdate, sodium phosphate (monohydrate, dihydrate), potassium phosphate (monohydrate, dihydrate), trisodium phosphate, tripotassium phosphate, sodium hydrogenphosphate (monohydrate, dihydrate), potassium hydrogenphosphate (monohydrate, dihydrate), disodium phosphate (anhydrate, dihydrate, dodeca-hydrate), and dipotassium phosphate (anhydrate, dihydrate, dodeca-hydrate), inorganic borate such as sodium borate, potassium borate, sodium metaborate, and potassium metaborate, and inorganic silicate such as sodium metasilicate, potassium metasilicate, sodium orthosilicate, and potassium orthosilicate. The inorganic salt contained in the lubricant composition is not limited to those. In some situations, two or more types of inorganic salt may be used.

The content of the inorganic salt is preferably within a range from 1 to 10% by mass of the total mass of the lubricant composition. When the content thereof is too little, the effect of the inorganic salt cannot be sufficiently exerted. In the case where the content is too much, the lubrication coating can be too thick when formed on the gear part, and the excess coating may be detached or solubilized. In the case where more than one type of inorganic salt are used, it is enough that the total content thereof is within the aforementioned range.

The lubricant composition may further contain ingredients such as sulfurized fatty acid, organic acid, organic amine, and an emulsifier. One, two, or three types of these ingredients may be contained, or all of the ingredients may be contained.

The sulfurized fatty acid means a sulfide of fatty acid. The sulfurized fatty acid has an effect on extreme pressure between metals. The sulfurized fatty acid can be a sulfide of fatty acid with 8 to 20 carbon atoms. Specific examples of the sulfurized fatty acid are sulfurized pelargonic acid, sulfurized lauric acid, sulfurized palmitic acid, sulfurized oleic acid, sulfurized stearic acid, sulfurized nonadecanoic acid, sulfurized linolenic acid, and sulfurized linoleic acid. In some situations, more than one type of sulfurized fatty acid may be used.

The content of sulfurized fatty acid is preferably within a range from 1 to 10% by mass of the total mass of the lubricant composition. When the content thereof is too little, the effect of the sulfurized fatty acid cannot be sufficiently exerted. In the case where the content is too much, the lubrication coating can be too thick when formed on the gear part, and the excess coating can be detached or solubilized. When more than one type of the sulfurized fatty acid are used, it is enough that the total content thereof is within the aforementioned range.

The organic acid means an acid of an organic compound such as benzoic acid, terephthalic acid, p-nitrobenzoic acid, p-toluyl acid, formylbezoic acid, anisic acid, phthalic acid, benzoylbenzoic acid, 3-methoxy-2-nitrobenzoic acid, and 4-methoxy-3-nitrobenzoic acid. Generally, a compound including a carboxyl group is used as the organic acid. In some situations, more than one type of organic acid may be used. The lubricant composition containing the organic acid increases an anti-corrosion effect on metal.

The content of the organic acid is preferably within a range from 0.1 to 10% by mass of the total mass of the lubricant composition. When the content thereof is too little, the effect of the organic acid cannot be sufficiently exerted. In the case where the content is too much, the lubrication coating can be too thick when formed on the gear part, and the excess coating can be detached or solubilized. When more than one type of organic acid are used, it is enough that the total content thereof is within the aforementioned range.

The organic amine means an organic compound having an amino or imino group. Specific examples of the organic amine include alkanolamine such as monoethanolamine, diethanolamine, triethanolamine, N,N-dimethylethanolamine, and N,N-diethylethanolamine. In some situations, more than one type of organic amine may be used. The lubricant composition containing the organic amine increases the anti-corrosion effect on metal.

The content of the organic amine is preferably within a range from 0.1 to 10% by mass of the total mass of the lubricant composition. When the content thereof is too little, the effect of the organic amine cannot be sufficiently exerted. In the case where the content is too much, the lubrication coating can be too thick when formed on the gear part, and the excess coating can be detached or solubilized. When more than one type of organic amine are used, it is enough that the total content thereof is within the aforementioned range.

It is possible to mix other additives in the lubricant composition. For example, an emulsifier, a viscosity adjuster, an anti-gelling agent, an anti-sagging agent, and the like can be mixed. Preferably, the emulsifier is mixed in the lubricant composition. When the emulsifier is added, the ingredients of the composition are uniformly dispersed, and a uniform coating can be formed. For the emulsifier, an anionic surfactant, a cationic surfactant, a nonionic surfactant, and an amphoteric surfactant can be used. Preferably, an anionic surfactant such as fatty acid amine salt or polyoxyalkylene alkyl ether or ester is used. In the case of using both the organic acid and amine, fatty acid amine salt is formed and can serve as the emulsifier. In such a case, a similar effect to the case of adding the emulsifier can be exerted without separately adding the emulsifier.

The content of the emulsifier is preferably within a range from 0.1 to 10% by mass of the total mass of the lubricant composition. When the content thereof is too little, the effect of the emulsifier cannot be sufficiently exerted. In the case where the content is too much, the lubrication coating can be too thick when formed on the gear part, and the excess coating can be detached or solubilized. When more than one type of emulsifier are used, it is enough that the total content thereof is within the aforementioned range.

Examples of the surfactant include the following compounds, but the surfactant is not limited to these compounds. Examples of the anionic surfactant include sodium laurate, sodium stearate, sodium oleate, ammonium lauryl sulfate, and sodium lauryl sulfate. Examples of the cationic surfactant include methyl ammonium chloride, lauryl ammonium chloride, stearyl ammonium chloride, dimethyl ammonium chloride, trimethyl ammonium chloride, lauryltrimethyl ammonium chloride, and polyoxyethylene monolaurylamine. Examples of the nonionic surfactant include polyethyleneglycol laurate ester, polyethyleneglycol oleate diester, glycerine oleate monoester, polyoxyethylene lauryl ether, and polyethyleneglycol distearate ester.

The components contained in the lubricant composition are dissolved or dispersed in a solvent. The solvent of the lubricant composition is basically water but need not to be composed of only water. Another ingredient may be mixed in the solvent to such a degree that evaporation of the solvent and handling are not adversely affected. For example, a small amount of methanol or ethanol may be contained.

The content of the solvent is determined by the contents of the ingredients present in the solvent. The content of the solvent is, not particularly limited, preferably 35 to 80% by mass of the total mass of the lubricant composition. When the content of the solvent is too much, the properties of the formed lubrication coating can be degraded. On the contrary, in the case where the content is too much, the lubrication coating can be too thick when formed on the gear part, and the excess coating can be detached or solubilized.

The lubricant composition is used for forming the lubrication coating on the surface of the gear part and reducing friction between the gear part and the member with which the gear part comes into contact. For the material of the gear part on which the lubrication coating is formed, carbon steel, chromium steel, chromium molybdenum steel, high-carbon chromium steel, aluminum, an aluminum alloy, and the like can be used.

Figure 3:
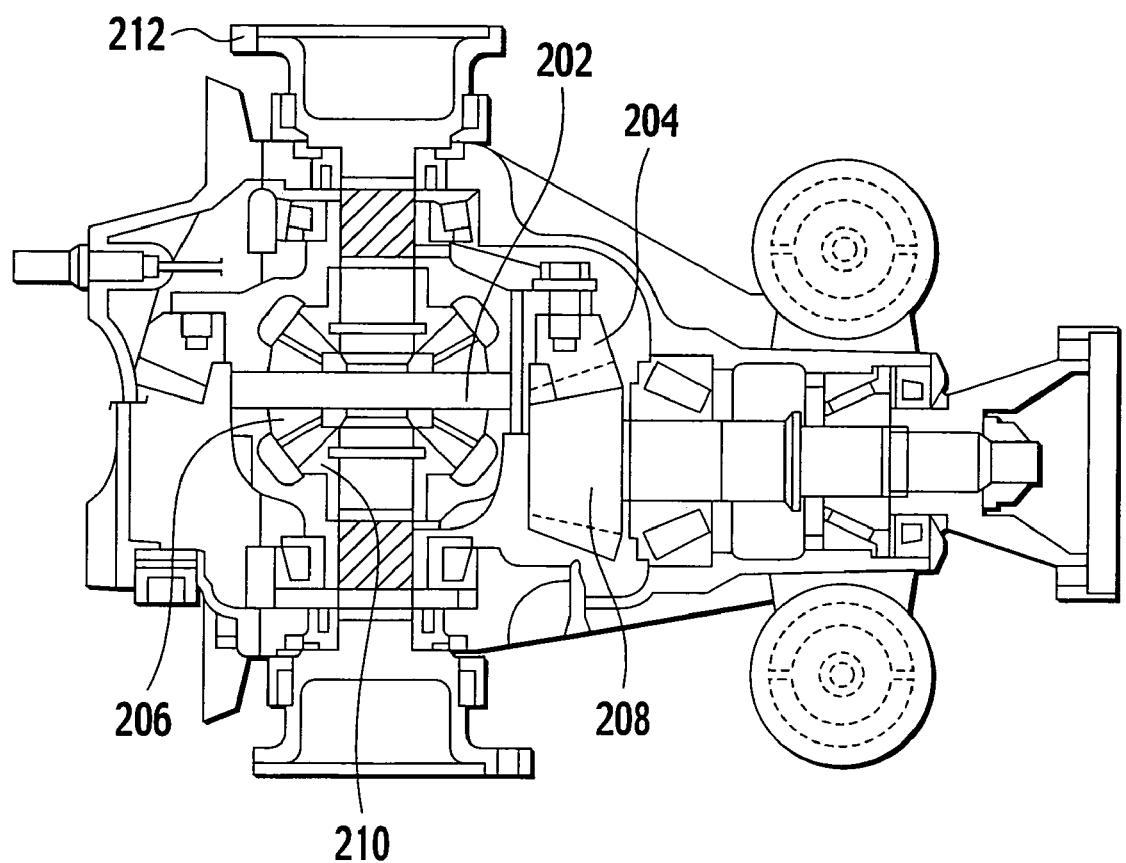
FIG. 3 is a schematic view of a final drive using the gear part of the present invention.

The gear part of the present invention is applied to a vehicle. The gear part of the present invention is used in, for example, a differential. Specific examples thereof include a pinion mate shaft, a ring gear, and a pinion mate gear. For reference, FIG. 3 shows a final drive including a pinion mate shaft 202, a ring gear 204, a pinion mate gear 206, a drive pinion gear 208, a side gear 210, and a side flange 212.

A second aspect of the present invention is a method of manufacturing a gear part on a surface of which a lubrication coating is formed to improve the initial fitness in engagement of tooth surfaces, the method including: adhering a lubricant composition to the surface of the gear part; and evaporating water within the lubricant composition adhered to the surface of the gear part. The lubricant composition includes water and an organic phosphorous compound capable of being transferred to the tooth surface of the counter member engaged with the gear part.

Preferably, the lubricant composition contains water and the alkylphosphonate derivative expressed by Formula I as the organic phosphorous compound. Further, the composition contains at least a type of inorganic salt selected from a group consisting of inorganic phosphate, inorganic borate, and inorganic silicate.

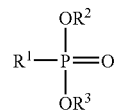

Formula I

In Formula I, $R^1$ is an alkyl group with 10 to 50 carbon atoms. $R^2$ and $R^3$ are either the same or different from each other. Each of $R^2$ and $R^3$ is a hydrogen atom or an alkyl group with 1 to 10 carbon atoms, and at least one of $R^2$ and $R^3$ is the alkyl group with 1 to 10 carbon atoms.

Figure 4A:
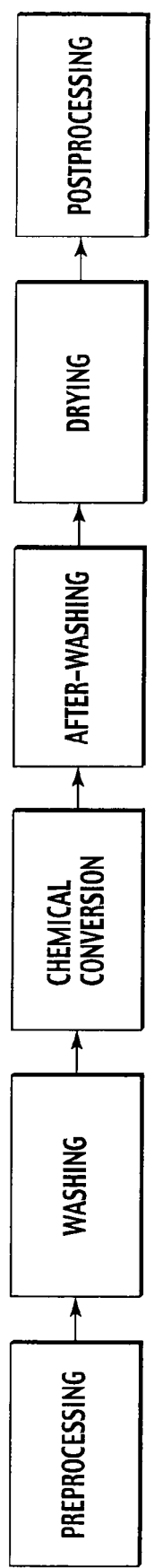
FIG. 4A is a flow chart showing a process of manufacturing the conventional lubrication coating.
Figure 4B:
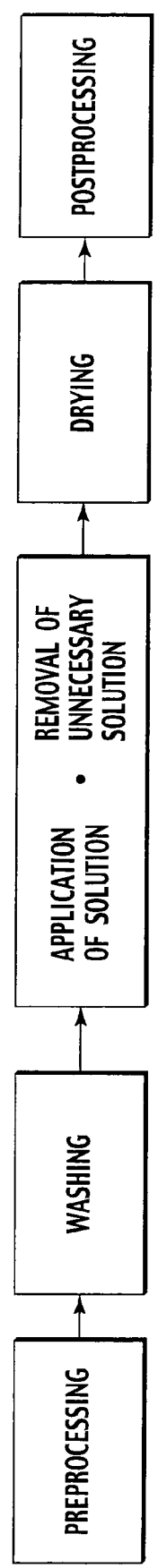
FIG. 4B is a flow chart showing a process of manufacturing the lubrication coating of the present invention.

FIG. 4A shows a conventional process of forming a lubrication coating, and FIG. 4B shows a process of forming a lubrication coating according to the present invention. In the conventional process, chemical conversion and after-washing are required after washing (FIG. 4A). The chemical conversion is a process in which a chemical conversion solution is maintained at a comparatively high temperature for a certain period of time. Moreover, the chemical conversion generally requires a specified chemical substance, and a manager for managing the manufacturing process is required. Moreover, the chemical conversion using a specified chemical substance is performed at high temperature and requires frequent maintenance of equipment.

On the other hand, in the case of forming the lubrication coating on the gear part by use of the lubricant composition specified by the present invention, the lubrication coating can be formed by immersing the gear part in a solution composed of the lubricant composition for a short period of time and then drying the same. The gear part is immersed in the lubricant composition at a comparatively low temperature for a comparatively short period of time. Therefore, the productivity of the gear part with the lubrication coating formed thereon can be increased, and the stock of finished goods can be reduced. In the case of forming the lubrication coating without using a specified chemical substance, human costs can be reduced, and the maintenance cycle of equipment can be lengthened. Moreover, using the lubricant composition specified by the present invention, the gear part just needs to be immersed in the composition, thus simplifying facilities for forming the lubrication coating and reducing the manufacturing costs.

For aforementioned various reasons, the manufacturing costs of the gear part with the lubrication coating formed thereon can be considerably reduced. However, the technical scope of the present invention is not limited to an embodiment including all of the aforementioned effects. For example, in the case of forming the lubrication coating by use of the conventional equipment, facility costs may not be changed from the conventional one. However, that does not eliminate such an embodiment from the technical scope of the present invention.

Next, a detailed description is given of the manufacturing method of the present invention. The specific examples of the lubricant composition and gear part used in the present invention are already described in the first aspect of the present invention, and the explanation thereof is omitted here.

First, the gear part on which the lubrication coating is to be formed and the lubricant composition are prepared. The gear part is preferably subjected to pretreatment such as degreasing and washing before the lubricant composition is adhered thereto.

Subsequently, the lubricant composition is adhered to the surface of the gear part. The method of adhesion is not particularly limited. Giving priority to easy handling, a dipping method is preferred, in which the gear part is immersed in the lubricant composition and taken out. In the case of forming the lubrication coating only in a predetermined place of the gear part, it is possible to employ a method of applying the lubricant composition to the predetermined place. As applying method in such a case, method such as a spray and a brush can be used. If enough thickness cannot be achieved by one application, dipping or application can be repeated twice or more.

Thereafter, solvent within the lubricant composition adhered on the surface of the gear part is evaporated. By the evaporation of the solvent within the lubricant composition, the lubrication coating is formed on the surface of the gear part. The solvent may be evaporated at around room temperature or forcibly evaporated at high temperature. Adopting the method of evaporating the solvent at around room temperature can eliminate the need for particular facilities or energy for drying, which is economical. Drying time is not particularly limited, but in view of an increase in productivity, it is preferable that the solvent evaporation is completed within a matter of minutes.

Next, a description is given of the present invention based on examples. The present invention is not limited to these examples.

EXAMPLES 1 TO 5

The lubricant compositions were prepared by mixing ingredients shown in FIG. 5. Gears of a final drive, which were the gear parts, are immersed in these lubricant compositions to adhere the lubricant compositions on the surfaces of the gears. Subsequently, water within the lubricant compositions was evaporated at room temperature to manufacture gears each of which had a lubrication coating formed on the surface. For checking the persistence of the lubricity, the relationship between the mileage and the remaining coating thickness was examined. In each case, it was confirmed that the lubrication coating was transferred to the counter member and the remaining coating was maintained for long periods.

The entire content of a Japanese Patent Application No. P2003-397408 with a filing date of Nov. 27, 2003 is herein incorporated by reference.

Although the invention has been described above by reference to certain embodiments of the invention, the invention is not limited to the embodiments described above will occur to these skilled in the art, in light of the teachings. The scope of the invention is defined with reference to the following claims.

What is claimed is:

1. A gear part, comprising:
a lubrication coating formed on a surface of the gear part, the lubrication coating formed by adhering an aqueous lubricant composition to the surface of the gear part and evaporating water, the lubricant composition consisting of:
(a) an alkylphosphonate derivative expressed by Formula I as an organic phosphorous compound,

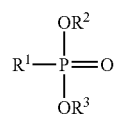

Formula I wherein $R^1$ is an alkyl group with 10 to 50 carbon atoms, $R^2$ and $R^3$ are either the same or different from each other, each of $R^2$ and $R^3$ is any one of a hydrogen atom and an alkyl group with 1 to 10 carbon atoms, and at least one of $R^2$ and $R^3$ is the alkyl group with 1 to 10 carbon atoms;
(b) at least one type of inorganic salt selected from a group consisting of inorganic phosphate, inorganic borate, and inorganic silicate;
(c) a sulfurized fatty acid;
(d) an organic acid;
(e) an organic amine;
(f) an emulsifier; and
(g) the water;
wherein when a tooth surface of the gear part is engaged with a tooth surface of a counter member, the organic phosphorous compound is transferred to the tooth surface of the counter member and another lubrication coating containing the organic phosphorous compound is formed on the tooth surface of the counter member.

2. A gear part according to claim 1, wherein the lubricant composition further consists of, with respect to the total mass of the lubricant composition, 0.1 to 10% by mass of the alkylphosphonate derivative, 1 to 10% by mass of the inorganic salt, 1 to 10% by mass of the sulfurized fatty acid, 0.1 to 10% by mass of the organic acid, 0.1 to 10% by mass of the organic amine, and 0.1 to 10% by mass of the emulsifier.

3. A method of manufacturing the gear part of claim 1, the method comprising:
adhering the aqueous lubricant composition on the surface of the gear part, and
evaporating the water within the aqueous lubricant composition adhered on the surface of the gear part in order to form the lubrication coating on the surface of the gear part.

4. The gear part according to claim 1, wherein the sulfurized fatty acid is selected from the group consisting of sulfurized pelargonic acid, sulfurized lauric acid, sulfurized palmitic acid, sulfurized oleic acid, sulfurized stearic acid, sulfurized nonadecanoic acid, sulfurized linolenic acid, and sulfurized linoleic acid.

5. The gear part according to claim 1, wherein the organic acid is selected from the group consisting of benzoic acid, terephthalic acid, p-nitrobenzoic acid, p-toluyl acid, formylbezoic acid, anisic acid, phthalic acid, benzoylbenzoic acid, 3-methoxy-2-nitrobenzoic acid, and 4-methoxy-3-nitrobenzoic acid.

6. The gear part according to claim 1, wherein the organic amine is selected from the group consisting of monoethanolamine, diethanolamine, triethanolamine, N,N-dimethylethanolamine, and N,N-diethylethanolamine.

7. The gear part according to claim 1, wherein the emulsifier is selected from the group consisting of an anionic surfactant, a cationic surfactant, a nonionic surfactant, and an amphoteric surfactant.

8. The gear part according to claim 1, wherein the inorganic salt comprises inorganic phosphate.

9. The gear part according to claim 1, wherein $R^1$ is selected from the group consisting of a decyl group, an undecyl group, a tetradecyl group, an octadecyl group, an i-octadecyl group, an eicosyl group, an octacosyl group, a triacontacyl group, a tetracontacyl group, a pentacontacyl group, a hexacontacyl group, a docosyl group, a tetracosyl group, a hexacosyl group, and a pentylcontacyl group.

* * * * *